United States Patent [19]

Itskovich et al.

[11] Patent Number: 5,814,988

[45] Date of Patent: Sep. 29, 1998

[54] COMBINATION NUCLEAR MAGNETIC RESONANCE AND ELECTROMAGNETIC INDUCTION RESISTIVITY WELL LOGGING INSTRUMENT AND METHOD

[75] Inventors: Gregory B. Itskovich; Stanislav Forgang, both of Houston, Tex.

[73] Assignee: Western Atlas International, Inc., Houston, Tex.

[21] Appl. No.: 790,922

[22] Filed: Jan. 29, 1997

[51] Int. Cl.$^6$ ................................................ G01V 3/00
[52] U.S. Cl. ........................................ 324/303; 324/322
[58] Field of Search .................................. 324/303, 300, 324/307, 309, 318, 322

[56] References Cited

U.S. PATENT DOCUMENTS

| 5,280,243 | 1/1994 | Miller | 324/303 |
| 5,451,873 | 9/1995 | Freedman et al. | 324/303 |
| 5,710,511 | 1/1998 | Taicher et al. | 324/303 |
| 5,712,566 | 1/1998 | Taicher et al. | 324/303 |

Primary Examiner—Louis M. Arana
Attorney, Agent, or Firm—Richard A. Fagin

[57] ABSTRACT

An apparatus for measuring induction resistivity and nuclear magnetic resonance properties of earth formations penetrated by a wellbore. The apparatus includes a magnet for inducing a static magnetic field in the formations, a transmitter antenna positioned proximal to the magnet and having a principal magnetic axis substantially perpendicular to the principal magnetic field direction of the magnet. The apparatus includes receiver antennas positioned at spaced apart locations from the transmitter antenna, a circuit for generating radio frequency power pulses which is selectively connected to the transmitter antenna, and circuits for measuring the voltages induced in both the transmitter antenna and induced in the receiver antennas. The measuring circuit is adapted to measure voltages in the receiver antennas during the radio frequency power pulses, when the voltages are induced in the receiver antennas by electromagnetic induction. The measuring circuit is also adapted to measure voltages induced in the transmitter antenna between successive power pulses, when the voltages are induced therein by nuclear magnetic resonance.

21 Claims, 5 Drawing Sheets

COMBINATION NUCLEAR MAGNETIC RESONANCE AND ELECTROMAGNETIC INDUCTION RESISTIVITY WELL LOGGING INSTRUMENT AND METHOD

BACKGROUND OF THE INVENTION

1. Field of the Invention

This invention is related to the fields of electromagnetic induction resistivity and nuclear magnetic resonance (NMR) logging of wellbores drilled through earth formations. More specifically, the invention is related to apparatus used for such wellbore logging which combine the capabilities of logging both NMR signals and electromagnetic induction signals in a single well logging instrument.

2. Description of the Related Art

Electromagnetic induction resistivity logging is known in the art for measuring the electrical resistivity of earth formations penetrated by wellbores. An induction resistivity wellbore logging instrument is described, for example in U.S. Pat. No. 5,452,761 issued to Beard et al. Measurements of electrical resistivity of the earth formations are used for, among other things, to infer the fluid content within pore spaces of some of the earth formations. Generally, electromagnetic induction resistivity wellbore logging instruments make measurements by passing an alternating electrical current through a transmitter coil. An alternating electromagnetic field is induced in the earth formations surrounding the transmitter coil. Eddy currents are induced in the earth formations as a result of the alternating electromagnetic field induced in the earth formations surrounding the transmitter. The eddy currents are generally related in magnitude to the electrical conductivity (the inverse of resistivity) of the earth formations. The eddy currents in turn induce voltages in receiver coils disposed on the instrument at spaced apart locations from the transmitter. Various detection circuits in the instrument enable determining the magnitudes of the induced voltages, and these magnitudes are then interpreted to provide an indication of the resistivity of the earth formations.

NMR well logging provides measurements related to the fractional volume of pose spaces in the earth formations, and can also provide measurements related to the distribution of sizes of the pore spaces. A typical NMR well logging instrument is described, for example in U.S. Pat. No. 4,717,877 issued to Taicher et al. Generally, NMR well logging instruments include a magnet to cause free protons in the earth formations (typically forming part of the fluids in the pore spaces) to align their axes of rotation (spin) with the magnetic field surrounding the magnet. A source of radio frequency (RF) current is applied to an antenna on the instrument in the form of controlled-duration pulses so as to cause momentary realignment of the spin axes with the magnetic field surrounding the antenna. After each RF pulse ends, the antenna is connected to a receiver circuit to detect electromagnetically induced voltages caused by the protons' spin axes precessionally rotating. Other RF pulses are sequentially applied to the antenna to cause the precessing protons to induce additional voltage signals in the antenna when the antenna is connected to the detection circuits after each successive RF pulse. These additional voltage signals typically decrease in peak amplitude as the amount of time elapsed from the initial RF pulse increases. The rate at which the amplitude of the additional voltage signals decreases is related to, among other things, the fractional volume of pore space and the distribution of sizes of the pore spaces.

A drawback to the NMR instruments known in the art is that they do not have any means to account for the effects of electrical conductivity (resistivity) on the amplitude of the proton-precession induced voltage measurements. As is known in the art, the magnitude of a voltage induced in an antenna by an alternating electromagnetic field of any particular magnitude can be materially affected by the electrical conductivity of the medium surrounding the antenna through which the electromagnetic field must propagate. If the magnitude of the proton-precession induced voltages in the NMR antenna is affected by formation conductivity, the calculations of the fractional volume of pore spaces and the distribution of sizes of the pore spaces can be adversely affected. Consequently, it is desirable to obtain measurements of the electrical conductivity (resistivity) of the earth formations surrounding the NMR instrument in order to correct the measurements of proton-precession induced voltage for the effects of the conductivity.

A simple solution to the problem of correcting the proton-precession induced voltage measurements for conductivity would be to include a conventional induction resistivity logging instrument in the instrument string used to log the earth formations. However, combining the induction resistivity instruments known in the art with the NMR instruments known in the art can make for a cumbersome and difficult to operate instrument string.

Simply combining the NMR and induction instruments within the same instrument housing, without more, would reduce the problems associated with the cumbersome and difficult to operate instrument combination as just described. However, it is likely that combining the induction and NMR instruments in the same instrument housing, without more, would result in parasitic coupling of induction logging signals into receiver circuits in the NMR portion of the instrument. This is because induction logging instruments typically have the transmitter operating substantially continuously. Harmonic multiple frequencies of the electromagnetic fields induced by the induction transmitter would be detected by the NMR receiver circuits during the times at which the NMR receiver is programmed to detect induced voltages caused by nuclear magnetic resonance, resulting in erroneous NMR measurements.

Accordingly, the invention is intended to provide a single instrument which is capable of logging both NMR-type signals and induction resistivity-type signals without parasitic coupling of induction signals to the NMR detection circuitry.

SUMMARY OF THE INVENTION

The invention is an apparatus for measuring both electromagnetic induction resistivity and nuclear magnetic resonance properties of earth formations penetrated by a wellbore. The apparatus includes a magnet for inducing a static magnetic field in the earth formations. A transmitter antenna is positioned proximal to the magnet. The transmitter antenna has having a principal magnetic axis which is substantially perpendicular to the principal magnetic field direction of the magnet. The apparatus includes receiver antennas positioned at spaced apart locations from the transmitter antenna. The apparatus includes a circuit for generating radio frequency power pulses which is selectively connected to the transmitter antenna, and circuits for measuring the voltages induced in both the transmitter antenna and induced in the receiver antennas. The measuring circuits are adapted to measure voltages induced in the receiver antennas during the radio frequency power pulses, when the voltages are induced by electromagnetic induction. The measuring circuit is also adapted to measure voltages induced in the transmitter antenna between successive power pulses, when the voltages are induced by nuclear magnetic resonance (NMR signals).

The invention includes a method of measuring the nuclear magnetic resonance and the electrical resistivity properties of earth formations. The method includes the steps of inducing a static magnetic field in the earth formations. The static magnetic field has a principal direction of magnetization. A radio frequency magnetic field is induced in the earth formations. The radio frequency (RF) magnetic field has a principal magnetization direction which is substantially perpendicular to the principal direction of magnetization of the static magnetic field. Voltages induced in a receiving antenna by nuclear magnetic resonance are measured. These voltages are measured between times at which the radio frequency magnetic field is induced. The nuclear magnetic resonance properties are determined by measuring the amplitudes of the voltages induced during these time periods. Voltages which are induced in the receiving antenna by electromagnetic induction are detected during times at which the radio frequency magnetic field is induced in the formations. In a particular embodiment, the resistivity is determined by measuring the phase and amplitude of the voltages induced while the RF magnetic field is induced.

In another embodiment of the invention, the method includes inducing an induction logging frequency electromagnetic field in the formation during a longitudinal relaxation period. While the induction logging frequency electromagnetic field is being induced, voltages induced in the receiver antenna are measured. The resistivity is determined from the magnitudes of an in-phase and quadrature component of the induced voltages measured during the times at which the induction logging frequency electromagnetic field is being induced.

DESCRIPTION OF THE PREFERRED EMBODIMENT

Figure 1:
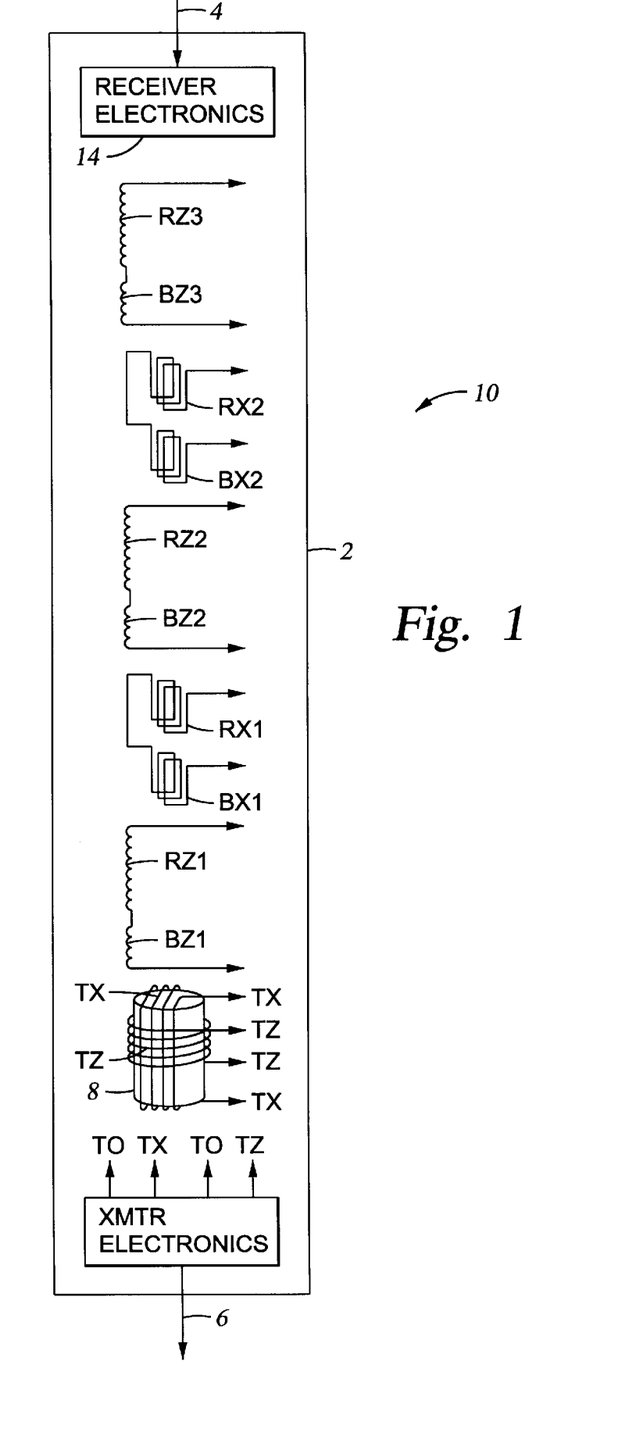
FIG. 1 shows an arrangement of transmitter and receiver coils along an instrument mandrel as used in the invention.

An arrangement of nuclear magnetic resonance (NMR) and electromagnetic induction transmitter coils and receiver coils for the combination logging instrument of the invention is shown in FIG. 1. In this embodiment of the invention, the transmitter and receiver elements are constructed as coils, and are so designated in the description of the invention which follows, but it is to be understood that other transmitter and receiver element structures which can induce electromagnetic fields of the proper orientation when alternating current is passed through them would be equally effective for this instrument. Therefore, the transmitter and receiver elements can be more generally referred to as antennas.

The combination logging instrument 10 usually includes an elongated instrument mandrel 2, which is preferably made from an electrically non-conductive and non-ferromagnetic material such as fiberglass. For reference in the description of this instrument 10, the axis of the mandrel 2 is shown generally at 6. A permanent magnet 8 disposed in the mandrel 2 provides a static (DC) magnetic field to reorient the spin axes of protons in the materials surrounding the mandrel 2 in the axial vicinity of the magnet 8. Preferably the magnet 8 includes a principal magnetic field direction which is substantially perpendicular to the mandrel axis 6, but this is not an absolute limitation on the invention.

A horizontal transmitter antenna (coil) TX is shown generally wound around the exterior surface of the magnet 8. The horizontal transmitter coil TX, as will be further explained, can be selectively connected to an NMR pulse transmitter and an induction transmitter for inducing appropriate electromagnetic fields in the materials surrounding the mandrel 2. The horizontal transmitter coil TX is so designated because its magnetic axis is substantially perpendicular to the mandrel axis 6 (which by industry convention is typically referred to as being "vertical"). The horizontal transmitter coil TX is preferably wound so that its principal magnetic axis is substantially perpendicular both to the mandrel axis 6 and perpendicular to the principal magnetic field direction of the magnet 8. This arrangement of the magnet 8 and the horizontal transmitter coil TX is explained, for example, in U.S. Pat. No. 4,717,877 issued to Taicher et al, as this arrangement of coil and magnet relates to making an NMR spin-echo measurement sequence. The Taicher '877 patent also describes suitable materials for the magnet 8, as well as the number of turns and placement of the turns for the horizontal transmitter coil TX.

A vertical transmitter coil TZ is also wound around the magnet 8. The vertical transmitter coil TZ is so designated because its principal magnetic axis is substantially parallel to the mandrel axis 6. The vertical transmitter coil TZ is preferably located approximately in the center of the axial length of the magnet 8 if it is to be used for both induction resistivity measurements and for NMR spin-echo measurements.

Various receiver coils can be positioned at axially spaced apart locations along the mandrel 6. The receiver coil positioned closest to the magnet 8 is shown as RZ1, and is referred to as one of the "vertical" receiver coils. Receiver coil RZ1 can have its magnetic axis substantially parallel to the mandrel axis 6. Receiver coil RZ1 can include a series interconnected "bucking" or "nulling" coil, shown as BZ1 and axially positioned with respect to receiver coil RZ1 to substantially cancel voltages induced directly in receiver coil RZ1 by the passage of alternating currents through the transmitter coils TX and TZ. Such arrangements of bucking coils are well known in the art for the purpose of canceling directly induced voltages in the receiver coils. Other vertical receiver coils having magnetic axes substantially parallel to the mandrel axis 6 are shown at RZ2 and RZ3, each having a respective interconnected bucking coil, BZ2 and BZ3. Although FIG. 1 shows three vertical receiver coils, the number of such vertical receiver coils and the axial spacings of each receiver coil from the associated transmitter coil as shown in the FIG. 1 are not meant to limit the invention. It may be desirable, for example, to include more vertical receiver coils (and associated bucking coils) to provide an overall set of induction measurements capable of being processed into calculations of resistivity having predetermined geometry of measurement with respect to the mandrel axis 6. An arrangement of coils suitable for making such a set of induction resistivity measurements is described, for example, in U.S. Pat. No. 5,452,761 issued to Beard et al.

The instrument 10 can also include horizontal receiver coils RX1 and RX2 at axially spaced apart locations along the mandrel axis 6. These coils are referred to as horizontal coils because their magnetic axes are substantially perpendicular to the mandrel axis 6. Each horizontal receiver coil RX1, RX2 can include a corresponding interconnected bucking coil BX1, BX2 used for the same "nulling" purpose as are the bucking coils (BZ1, BZ2, BZ3) series connected to the vertical receiver coils. Preferably the horizontal receiver coils RX1, RX2 and their associated bucking coils BX1, BX2 have their magnetic axes substantially parallel to the magnetic axis of the horizontal transmitter coil TX. As is the case with the vertical receiver coils, the axial position and the number of horizontal receiver coils as shown in FIG. 1 is meant only for illustrative purposes and is not meant to limit the invention. The purpose of the horizontal receiver coils will be further explained.

The transmitter coils TX, TZ can be connected to a transmitter electronics unit 12. Circuits on the transmitter electronics unit 12 and their functions will be further explained. Similarly, the receiver coils RX1, RX2, RZ1, RZ2, RZ3 (and their series-interconnected bucking coils) can be connected to a receiver electronics unit 14. The circuitry on the receiver electronics unit 14 will be further explained. Typically the receiver electronics unit 14 will include some form of telemetry transceiver (not shown in FIG. 1) to send to the earth's surface, along an armored electrical cable 4, signals corresponding to the voltages measured in each receiver coil. The axial locations along the mandrel 2 of the transmitter electronics unit 12 and the receiver electronics unit 14 as shown in FIG. 1 are preferred in order to reduce the amount of parasitic coupling, of power supplied to the transmitter coils, directly into the receiver coils or into voltage measuring circuits located on the receiver electronics unit 14.

Figure 2:
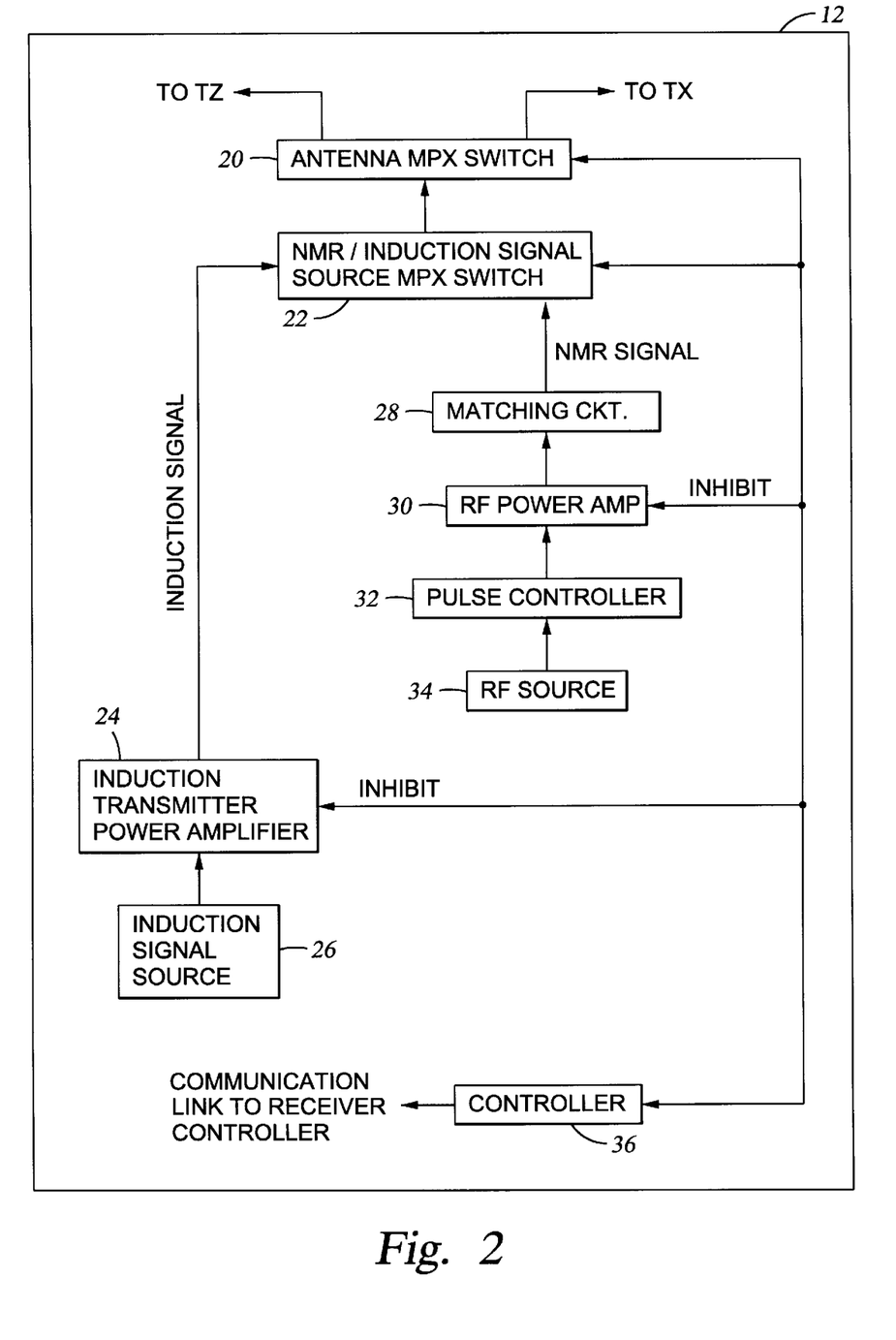
FIG. 2 shows a functional block diagram of a transmitter electronics unit used with the apparatus of the invention.

A functional block diagram of the transmitter electronics unit 12 is shown in FIG. 2. Operation of the various components of the transmitter electronics unit 12 can be programmed by a transmitter controller 36. The transmitter controller 36 can be any suitable microprocessor such as an INTEL Corp. model EB186. A signal suitable for making induction resistivity measurements can be generated by an induction signal source 26. The induction signal source 26 can be an analog oscillator, or preferably a digital signal generator including a read only memory (ROM) whose output is conducted through a digital-to-analog converter and then to a low-pass filter. Such a digital signal generator is described, for example, in U.S. Pat. No. 5,585,727 issued to Fanini et al. Typically, induction resistivity signals include sine- or square-wave voltages having a frequency in the range of 10 to 200 kHz. However, the stated frequency range is not meant to limit the output frequency range of the induction signal source 26. It is also known in the art to make measurements of voltages induced in a receiver antenna by an electromagnetic field having much higher frequencies to determine formation resistivity. See for example, U.S. Pat. No. 4,899,112 issued to Clark et al wherein resistivity-related measurements can be made within a frequency range of about 0.1 to 10 MHz. The frequency range selected will depend on the type of measurements made by the instrument 10 to determine resistivity. As will be further explained, it is only necessary that the induction signals source 26 not have the same output frequency as a radio frequency signal source used to make NMR measurements.

The output of the induction signal source 26 can be conducted to an induction transmitter power amplifier 24. The induction transmitter power amplifier 24 can be momentarily inhibited, during an NMR measurement sequence, by an inhibit command input from the controller 36. The output of the induction power amplifier 24 can be connected to a NMR/induction signal source multiplexer (SS-MPX) switch 22. During transmission of an induction measurement sequence, which will be further explained, the SS-MPX switch 22 conducts the output of the induction power amplifier 24 to an antenna multiplexer (ANT-MPX) switch 20. The ANT-MPX switch 20 conducts the signal to the particular transmitter coil, either TX or TZ, used to make the particular induction measurement. Selective operation of both the ANT-MPX 20 and SS-MPX 22 switches to conduct the desired signal output to the appropriate transmitter coil is controlled by the transmitter controller 36.

A signal suitable for an NMR measurement sequence can be initiated in a radio frequency (RF) source 34. The RF source 34 can be an analog oscillator or a digital signal generator as previously described for the induction signal source 26. The output of the RF source 34 typically has a frequency in the range of 0.5 to 2 MHz. The actual frequency selected for the RF source 34 will depend, as is known in the art, on the spatial distribution of the magnetic field induced by the magnet (8 in FIG. 1), the spatial distribution of the RF magnetic field induced by passing RF power through one of the transmitter coils (TX or TZ), and the radial depth from the mandrel axis (6 in FIG. 1) into the materials surrounding the mandrel 6 that the NMR measurements are desired to be made. The output of the RF source 34 is conducted to a pulse controller 32, which determines the length of each RF power pulse ultimately applied to the selected transmitter coil (TX or TZ) for generating an NMR measurement sequence. The output of the pulse controller 32 is conducted to an RF power amplifier 30. Similar to inhibiting the induction power amplifier 24 during an NMR measurement sequence, the RF power amplifier 30 can also be momentarily inhibited by command from the controller 36 during transmission of an induction measurement sequence. The timing of these events will be further explained.

A matching circuit 28 should be interposed between the selected transmitter coil (TX or TZ) and the output of the RF power amplifier 30. The matching circuit 28 tunes the system including the RF power amplifier 30 output and the selected transmitter coil (TX or TZ) to resonate at the selected RF frequency. The overall circuitry used to provide the NMR measurement sequence, including the RF source 34, pulse controller 32, RF power amplifier 30 and matching circuit 28 can be types known in the art some of which are described, for example, in U.S. Pat. No. 4,710,713 issued to Taicher et al.

It is contemplated that the NMR measurement sequence will typically be conducted from the horizontal transmitter coil TX, although it is to be understood that this is not a limitation on the invention. If the magnet 8 has a principal magnetization direction as described previously herein, then the vertical transmitter coil TZ will have a principal magnetic axis perpendicular to the principal direction of the magnetic field induced by the magnet (8 in FIG. 1). Therefore it is also possible to use the vertical coil TZ to make NMR measurements, provided that suitable matching to the RF power amplifier 30 is provided as for the horizontal transmitter coil TX. As will be further explained in the description of the receiver electronics unit 14, when an NMR measurement sequence is being performed, the ANT multiplexer switch 20 can be set to disconnect both transmitter coils (TX, TZ) from any signal source during the receiving portions of the NMR measurement sequence. In this manner, the coil which is used to transmit the RF pulses (either TX or TZ) can be connected to a receiving circuit in the receiver electronics unit 14 for the purpose of making NMR measurements.

The induction measurement sequence is intended to be performed by selectively using either the vertical TZ or the horizontal TX transmitter coil. During transmission of an induction measurement sequence through the vertical transmitter coil TZ, generally the voltages induced in the vertical receiver coils (RZ1, RZ2, RZ3 in FIG. 1) will be measured. Similarly, during transmission of an induction measurement sequence through the horizontal transmitter coil TX, the voltages induced in the horizontal receiver coils (RX1, RX2 in FIG. 1) will be measured. It is to be understood that the instrument 10 need not include both horizontal and vertical coils in order to perform as intended by the invention. It is only necessary to include either a set of horizontal receiver coils or vertical receiver coils, depending on which orientation is used for the transmitter coil. If only horizontal coils are used, then the horizontal transmitter coil TX can be used to transmit both NMR and induction signals in a measurement sequence, the timing of which will be further explained. The same holds true if only vertical coils are used as to the vertical transmitter coil TZ.

Figure 3:
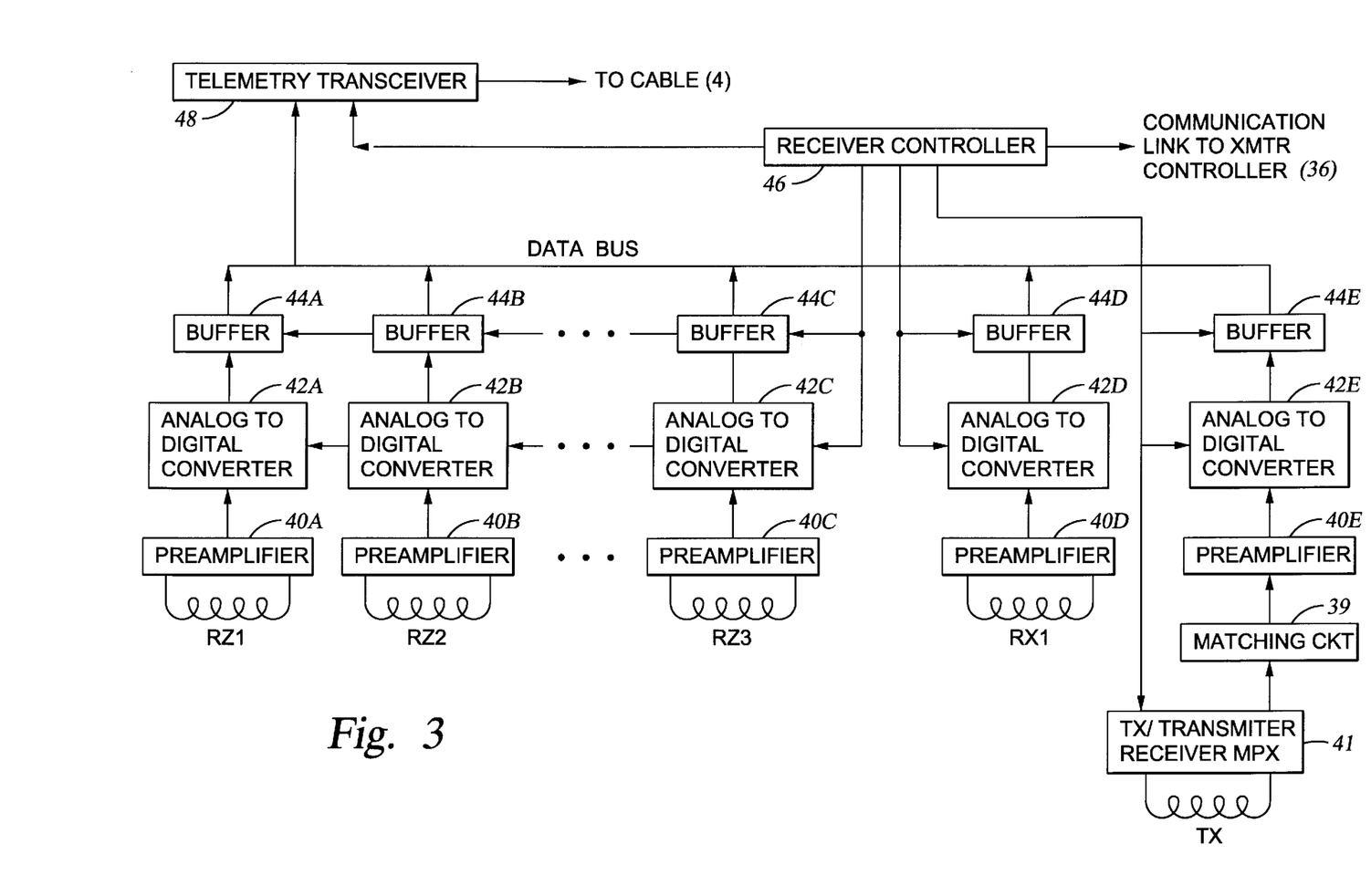
FIG. 3 shows a functional block diagram of a receiver electronics unit used with the apparatus of the invention.

A functional block diagram of the receiver electronics unit is shown in FIG. 3. Each receiver coil used for induction logging measurement, such as RZ1, RZ2, RZ3 and RX1 as shown in FIG. 3, can be connected to a corresponding preamplifier 40A–40D. Receiver RX2 is omitted for clarity of the illustration, and as previously explained, the receiver coils in FIG. 1 are shown only to illustrate the general configuration of the instrument 10. If a larger number of receiver coils than shown in FIG. 1 is actually used for induction logging, then each such receiver coil may be connected to a corresponding preamplifier.

Each preamplifier can be connected to a corresponding analog-to-digital converter (ADC) 42A–42D. Alternatively, the preamplifiers may be multiplexed to the input of a single ADC. An ADC system which will be suitable for use in the receiver electronics unit 14 is described, for example, in U.S. Pat. No. 5,585,727 issued to Fanini et al. The digital samples output from each ADC 42A–42D can be directed to a corresponding buffer 44A–44D for storage until the time for insertion in a telemetry scheme. When each buffer's contents is to be inserted into the telemetry scheme, that buffer can receive an instruction from a receiver controller 46 to transfer the buffer's contents to a telemetry transceiver 48, where the signal corresponding to the buffer's contents can be sent along the cable 4 to the earth's surface. Alternatively, digital signal samples from each ADC 42A–42D, corresponding to the same relative time in each cycle of the alternating current used to energize one of the transmitter coils during an induction logging measurement sequence, can be stacked in each buffer for a number of induction logging cycles.

This process, referred to as synchronous stacking, is described in U.S. Pat. No. 5,452,761 issued to Beard et al. It is to be understood that transmission of the buffer contents to the earth's surface is not required in the invention. It is also possible to store buffer contents until the instrument 10 is withdrawn from the earth formations so that the buffers can be interrogated.

The receiver controller 46 also instructs each ADC 42A–42D to digitize signals from receiver coils which correspond to the transmitter coil being energized for induction measurement. For example, if the vertical transmitter coil TZ is being energized during an induction measurement sequence, then ADC's 42A, 42B and 42C would be instructed to digitize signals from their corresponding receiver coils. The ADC 42D corresponding to horizontal receiver coil RX1 would be inhibited. Similarly, during transmission of an induction logging measurement signal through the horizontal transmitter coil TX, ADC 42D would be instructed to digitize, and ADC's 42A–42C would be inhibited.

The NMR receiving circuitry is slightly different than the induction receiving circuitry. Generally, in NMR measurement the same coil used to transmit the RF pulses is also used to receive the proton-precession induced voltages. For example, if the horizontal transmitter coil (TX in FIG. 1) is used to transmit the RF pulses, then during the receiving portions of the NMR measurement sequence, when the ANT multiplex switch (20 in FIG. 2) is open to both signal sources, a transmit/receive multiplex switch 41 can selectively connect coil TX to a receiver matching circuit 39. The transit/receive matching circuit 39 can be operated on command from the receiver controller 46. The receiver matching circuit 39 is provided to tune the receiver circuit (consisting of the coil TX and a preamplifier 40E) to the RF frequency used for NMR measurement. This frequency, as previously stated, is generally in the range of about 1 to 2 MHz. The matching circuit 39 can be connected to a preamplifier 40E which together can have a relatively narrow receiving bandwidth of about 4 kHz, which is suitable for NMR signal reception. The output of the preamplifier 40E can be conducted to an ADC 42E which is timed to operate with respect to the transmission of the RF pulses passed through transmitter coil TX upon command by the receiver controller 46. The receiver controller 46 can maintain synchronization with the transmitter controller (36 in FIG. 2) by means of a communication link. The output of the ADC 42E can be conducted to another buffer 44E. If it is desired to transmit the NMR sequence measurements to the earth's surface, then the buffer 44E contents can be transferred to the telemetry transceiver 48 on command by the receiver controller 46.

If it is desired to use the vertical transmitter coil TZ for transmission and reception of NMR signals, then the transmit/receive multiplex switch 41 can be connected to the vertical transmitter coil TZ. Alternatively, an additional receiver multiplexer (not shown) can be provided to selectively connect the coil, through which the RF pulses are conducted, to the matching circuit. If orthogonal transmission and reception of NMR signals is desired, this additional receiver multiplexer can be selected to connect to the matching circuit the opposite coil than the one used to transmit the RF pulses.

Figure 4:
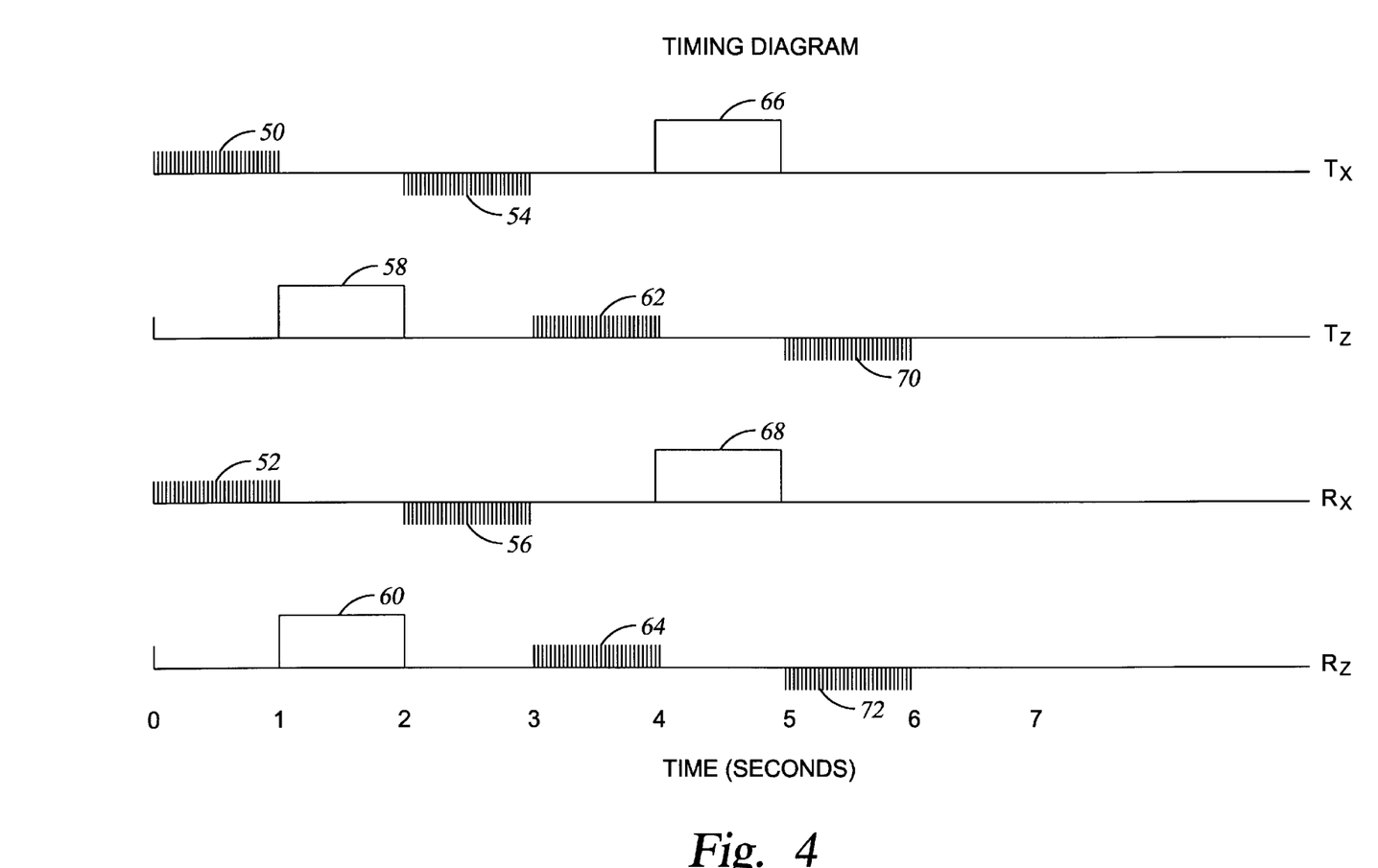
FIG. 4 shows an operating time diagram for the various transmitter and receiver coils in the instrument of the invention.

FIG. 4 is a timing diagram for the operation of the various receiver coils and transmitter coils in the instrument 10. The timing diagram in FIG. 4 is meant to illustrate some of the possible combinations of transmission and reception of both NMR and induction logging signals. It is not meant to be an exhaustive representation of the timing combinations possible with the instrument 10.

The uppermost horizontal axis in FIG. 4 represents the times at which power is applied to the horizontal transmitter coil TX. The second horizontal axis represents times at which power is applied to the vertical transmitter coil TZ. The third and fourth axes represent, respectively, the times at which the outputs of the preamplifiers connected to the horizontal RX and vertical RZ receiver coil sets are digitized.

Sets of thin vertical lines at 50 represent RF pulses applied to TX by the RF power amplifier (30 in FIG. 2), and the times at which TX is connected to the receiver electronics unit (14 in FIG. 2) in order to measure a Carr-Purcell-Meiboom-Gill (CPMG) NMR pulse-echo sequence. Timing and operation of the instrument so as to measure a CPMG pulse-echo sequence is well known in the art. At 54, a similar set of thin vertical lines having opposite polarity is shown to represent a second CPMG sequence (also having inverted polarity) measured through horizontal transmitter coil TX. As is known in the art, the second (opposite polarity) CPMG sequence 54 can be synchronously stacked with the first CPMG sequence 50 to provide a combined output having reduced effect of "magnet ring". The synchronously stacked CPMG sequences are referred to in the art as a "phase alternate pairs" (PAPS) measurement sequence. A novel aspect of the invention is the operation of the horizontal receiver coils (RX1, RX2 in FIG. 1) during the exact times at which the RF pulses are applied to the horizontal transmitter coil TX. This is shown as the set of thin vertical lines at 52. The duration of the pulses is typically on the order of several hundred microseconds or more. This is sufficient time to induce an electromagnetic field substantially at equilibrium in the materials surrounding the instrument 10. During application of the RF power pulses to the horizontal transmitter coil TX, voltages will be induced in the horizontal receiver coils (RX1, RX2) whose amplitude and phase depend on the conductivity of the earth formation and the axial spacing of each particular horizontal receiver coil from the transmitter coil TX. As previously explained, the RF power pulses typically have a frequency in the range of 1 to 2 MHz. The frequency of the RF pulses is such that the conductivity of the material (earth formation) axially disposed between the horizontal receiver coils (RX1, RX2) is preferably determined by calculating the difference in phase and/or the difference in amplitude between the induced voltages at the horizontal receiver coils. Methods of determining the conductivity in this manner are described, for example, in U.S. Pat. No. 4,899,112 issued to Clark et al. A similar set of measurements and phase and/or amplitude calculations can be made during the second CPMG sequence 54, as shown by the horizontal receiver coils RX being active at 56.

A CPMG measurement set similar to the one made through the horizontal transmitter coil TX can also be made through the vertical transmitter coil TZ. The CPMG sequences stacked to form the PAPS sequence are shown at 62 and 64. During the transmission of the RF pulses for the PAPS measurement sequences made through the vertical transmitter coil, the vertical receiver coils can be active to measure the magnitude of the voltages induced therein as shown at 64 and 72.

As is known in the art, NMR pulse-echo measurement sequences, including the opposite-polarity components of a PAPS sequence, are best initiated at spaced apart times corresponding to the so-called longitudinal relaxation time ($T_1$). $T_1$ represents the amount of time for the bulk magnetization of the protons in the material to realign with the magnetic field applied by the magnet (8 in FIG. 1). $T_1$ can have values in the range of about 0.75 to 1.5 seconds for typical earth formations. The times between portions of the NMR measurement sets in FIG. 4 are shown as being 1.0 second to illustrate the principle of the timing of the instrument. It is contemplated that the timing sequence can be reprogrammed to accommodate various values of $T_1$ simply be reprogramming the transmitter controller (36 in FIG. 2) and the receiver controller (46 in FIG. 3). In the invention, conventional induction logging measurements can be made during the $T_1$ recovery period. For example, when the horizontal transmitter coil is programmed to make a PAPS measurement sequence, as shown at 50 and 54, the recovery time between PAPS can be used to make induction measurements as shown at 58 and 60. Time block 58 represents the time at which the induction transmitter power amplifier (24 in FIG. 2) is connected to the vertical transmitter coil TZ. During this same time, the ADC's (42A–42C in FIG. 3) connected to the vertical receiver coils (RZ1, RZ2, RZ3) are active. Measurements of the voltages induced in the vertical receiver coils can then be used to calculate conductivity of the earth formations as is described, for example, in U.S. Pat. No. 5,452,761 issued to Beard et al. The process for determining conductivity described in the Beard et al '761 patent is not meant to be an exclusive representation of methods of determining conductivity from measurements of the induced voltages. Typically, however, the conductivity of the earth formations (medium surrounding the instrument 10) is calculated by determining a magnitude of a component of the voltage induced in the receiver coils which is substantially in-phase with the current flowing through the transmitter coil. In certain instances, the measurement of the magnitude of the in-phase component can be combined with a measurement of the induced voltage component which is 90 degrees out of phase (referred to as a quadrature component) to provide improved determination of conductivity when such conductivity is relatively high. Methods of using the in-phase and quadrature components to determine conductivity are known in the art. It should be noted that if conventional induction resistivity measurements are made as described during the $T_1$ recovery period, then the frequency selected for the conventional induction resistivity measurements should be different from the frequency of the RF power pulses used to make the NMR measurements. This will enable the nuclei which were excited by the RF power pulses during the NMR measurement sequence to realign their spin axes with the static magnetic field induced by the magnet (8 in FIG. 1).

The output of the induction logging source, as previously explained, can comprise sine- or square-wave signals in the range of about 10 to 200 kHz. Other methods for determining conductivity from the measurements of induced voltage given this frequency range and signal waveform are known in the art. In a similar manner, the horizontal transmitter coil TX and horizontal receiver coils RX can be used to make induced voltage measurements for the purposes of determining conductivity. This is shown on the timing diagram of FIG. 4 at 66 and 68. The uses for measurements of conductivity made from the horizontal coils (TX, RX1, RX2) are described in L. Tabarovsky and M. Epov, *Geometric and Frequency Focusing in Exploration of Anisotropic Seams*, Nauka, USSR Academy of Science, Siberian Division, Novosibirsk, pp. 67–129 (1972).

Figure 5:
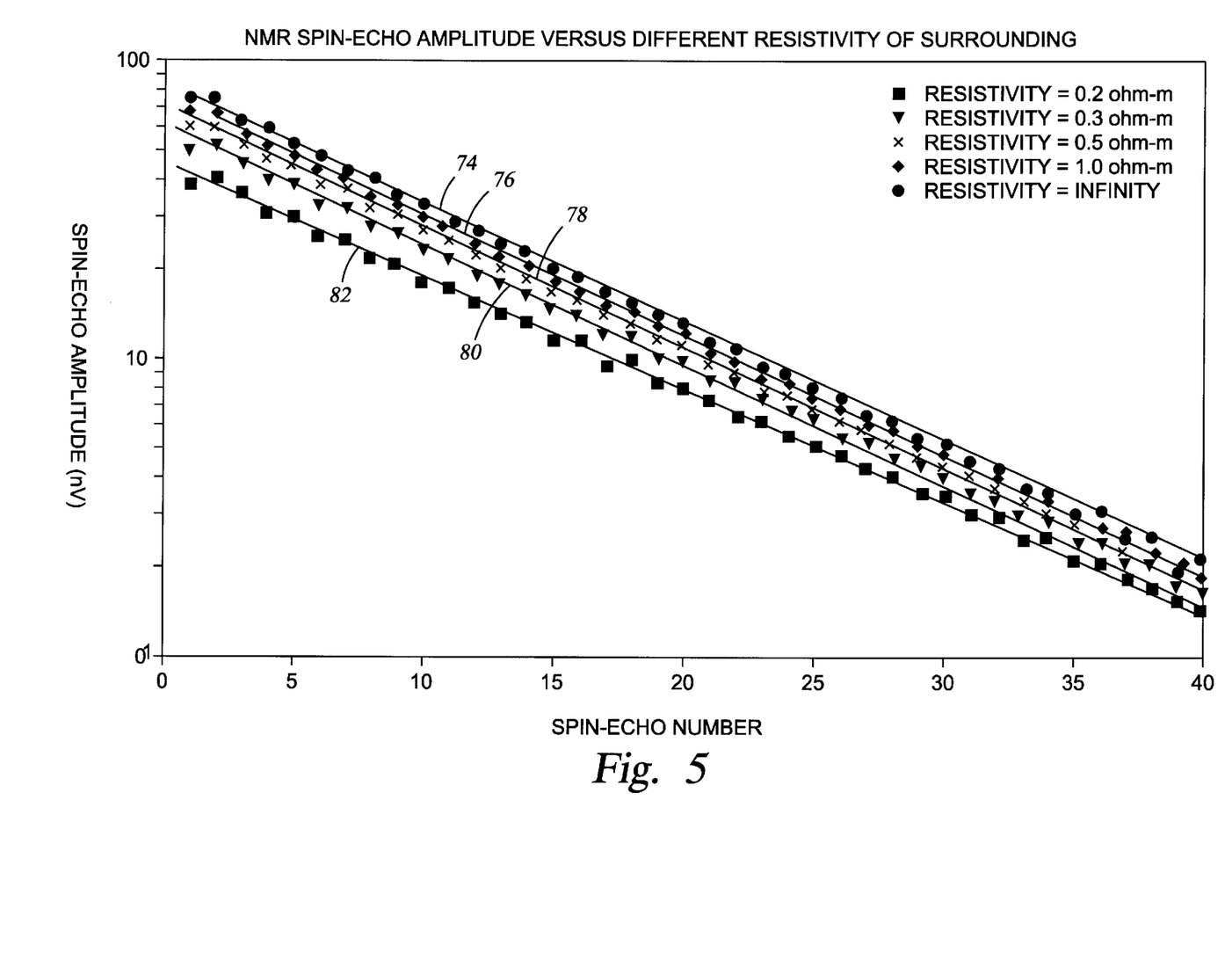
FIG. 5 shows a graph of spin-echo amplitudes for NMR measurements made in media having different electrical conductivities.

It has been determined that knowledge of the conductivity of the materials surrounding the instrument 10 can provide improved determination of the fractional volume of pore space and the distribution of pore sizes in the materials as determined from the NMR signals. FIG. 5 shows results of simulating the NMR signal response of the instrument 10, in a medium consisting substantially entirely of water having various values of conductivity. Each point in the graph of FIG. 5 represents the peak amplitude of a spin-echo in a CPMG measurement sequence, beginning with the first spin echo after the initial 90-degree transverse polarization pulse. Spin-echo amplitude curves representing a best-fit through corresponding sets of amplitude points are shown at 74, 76, 78, 80 and 82 for conductivity values of zero, 1000 mS/m, 2000 mS/m, 3333 mS/m and 5000 mS/m, respectively. As can be observed in FIG. 5, there can be as much as a factor of two difference between the amplitudes of the spin-echoes detected in a non-conductive medium and those detected in a very conductive medium.

A simple means for adjusting the NMR signal response would be to store the results of the simulation as shown in FIG. 5 in a computer look-up table and calculate an adjustment factor for each measured value of spin-echo amplitude based on a value of resistivity of the materials surrounding the instrument 10. As previously described herein, the instrument 10 provides several means for determining the resistivity of the materials.

The simulation result shown in FIG. 5, however, represents a simple case wherein the materials surrounding the instrument 10 have only a single value of resistivity. As is known in the art, it is quite often the case that the materials (formations) surrounding the instrument will have two or more values of resistivity. The earth formations surrounding the instrument often are disposed in layers of various thicknesses, each layer having at least one value of resistivity which may be different from the resistivity of the other layers. Each of these layers can itself have radially separated zones wherein the resistivity can be different at different radial distances from the axis of the instrument, principally as a result of infiltration into the pore spaces of the formation of the liquid phase of a fluid used to drill the wellbore. This process of infiltration and its effect on resistivity of the surrounding formations is well known in the art, as described, for example in, E. Bigelow, *Introduction to Wireline Log Analysis,* Western Atlas Logging Services, Houston, Tex. (1992) pp. 9–20. The result is that the resistivity is spatially distributed in some manner which should be more precisely determined in order to adjust the NMR signals.

Resistivity of the materials surrounding the instrument, as previously explained, can be determined in several different ways. In order to determine the spatial distribution of the resistivity, the method preferred for determining the resistivity includes energizing the horizontal transmitter coil TZ using the induction logging signal source during the transverse relaxation ($T_1$) periods, and measuring the voltages induced in the horizontal receiver coils RZ1, RZ2, RZ3. Induced voltage measurements from the horizontal receiver coils can be used to determine the radial and axial distribution of resistivity within the formation surrounding the instrument. Methods for converting the induced voltage measurements into a resistivity distribution are known in the art. Such a method is described, for example in, L. Tabarovsky and M. Rabinovich, *High-Speed 2-D Inversion of Induction Logging Data,* Transactions of the 37th Annual Well Logging Symposium, New Orleans, La., pp. 1–10, Society of Professional Well Log Analysts, Houston, Tex. (1996).

The amplitudes of the NMR spin-echoes can be simulated in the laboratory for various distributions of resistivity of the formation surrounding the instrument. Methods for simulating the spin echo amplitude response of an NMR instrument are known in the art. The resistivity distribution of the formation, which was determined from the inducted voltage measurements, can then be used to enable adjustment of the measured NMR spin echo amplitude values. Spin-echo amplitude adjustment factors for various resistivity distributions can be stored in look-up tables (residing in a computer program if desired) based on the laboratory-simulated spin-echo amplitudes, or alternatively, equations representing each best fit curve for various resistivity distributions can be determined to calculate the adjusted spin-echo amplitude based in the measured spin-echo amplitude.

Those skilled in the art will readily devise other embodiments of this invention which do not depart from the spirit of the invention. Accordingly, the invention should be limited in scope only by the attached claims.

What is claimed is:

1. An apparatus for measuring induction resistivity and nuclear magnetic resonance properties of earth formations penetrated by a wellbore, comprising:

a magnet for inducing a static magnetic field in said earth formations;

a first antenna having a principal magnetic axis substantially perpendicular to a principal direction of said static magnetic field;

receiver antennas positioned at spaced apart locations from said first antenna;

means for generating radio frequency power pulses selectively connected to said first antenna; and means for measuring voltages induced in said first antenna and induced in said receiver antennas, selectively connected to said first and to said receiver antennas, said means for measuring adapted to measure voltages induced in said receiver antennas during said radio frequency power pulses wherein said voltages are induced by electromagnetic induction in said earth formations, said means for measuring voltages adapted to measure voltages in said first antenna between successive ones of said power pulses wherein said voltages are induced by nuclear magnetic resonance.

2. The apparatus as defined in claim 1 wherein said radio frequency power pulses comprise a frequency in a range of about 0.5 to 2 MHz, a first one of said radio frequency power pulses having a duration causing magnetic spin axes of nuclei in pore spaces of said earth formation to rotate approximately 90 degrees, subsequent ones of said radio frequency power pulses having durations causing said magnetic spin axes to rotate approximately 180 degrees.

3. The apparatus as defined in claim 1 further comprising an induction signal generator selectively connected to said first antenna.

4. The apparatus as defined in claim 3 wherein said induction signal generator comprises a sine wave output in a frequency range of about 10 to 200 kHz.

5. The apparatus as defined in claim 3 wherein said induction signal generator comprises a square wave output in a frequency range of about 10 to 70 kHz.

6. The apparatus as defined in claim 3 wherein said induction signal generator is connected to said first antenna and is timed to operate during longitudinal relaxation periods occurring between successive nuclear magnetic resonance measurement sequences.

7. The apparatus as defined in claim 3 wherein said means for measuring voltages comprises means for determining a magnitude of a voltage component in phase with an output of said induction signal generator.

8. The apparatus as defined in claim 3 wherein said means for measuring voltages comprises means for determining a magnitude of a voltage component in quadrature with respect to an output of said induction signal generator.

9. The apparatus as defined in claim 1 wherein said means for measuring voltages comprises means for determining a difference in phase and a difference in amplitudes between said voltages induced in pairs of said receiver antennas.

10. The apparatus as defined in claim 1 further comprising:

a second antenna having a principal magnetic axis substantially perpendicular to said magnetic axis of said first antenna and substantially perpendicular to said direction of said static magnetic field, said second antenna selectively connected to said means for generating said radio frequency power pulses, said means for measuring voltages and said induction signal generator.

11. The apparatus as defined in claim 10 wherein at least one of said receiver antennas has a principal magnetic axis substantially parallel to said magnetic axis of said second antenna.

12. A method of measuring nuclear magnetic resonance and electrical resistivity properties of earth formations, comprising:

inducing a static magnetic field in said earth formations;

inducing a radio frequency magnetic field in said earth formations, said radio frequency magnetic field having a principal direction substantially perpendicular to a principal direction of said static magnetic field;

detecting voltages induced in an antenna by nuclear magnetic resonance; and detecting voltages induced in said antenna by electromagnetic induction during times at which said radio frequency magnetic field is induced.

13. The method as defined in claim 12 wherein said nuclear magnetic resonance properties are determined from amplitudes of said voltages induced in said antenna as a result of said nuclear magnetic resonance.

14. The method as defined in claim 12 wherein said resistivity properties are determined from phases and amplitudes of said voltages induced during said times at which said radio frequency magnetic field is induced.

15. The method as defined in claim 12 further comprising:

inducing an induction logging frequency electromagnetic field in said earth formations during a longitudinal relaxation period occurring between successive measurement sequences of said step of inducing said radio frequency magnetic field; and detecting voltages induced in said antenna by said induction logging frequency electromagnetic field.

16. The method as defined in claim 15 wherein said resistivity properties are determined by measuring a magnitude of an in-phase component of said voltages induced by said induction logging frequency electromagnetic field.

17. The method as defined in claim 16 further comprising measuring a magnitude of a quadrature component of said voltages induced by said induction logging frequency electromagnetic field, wherein said resistivity properties are determined by combining said magnitude of said in phase and said magnitude of said quadrature components of said induced voltages.

18. A method of measuring nuclear magnetic resonance and electrical resistivity properties of earth formations, comprising:

inducing a static magnetic field in said earth formations;

inducing a radio frequency magnetic field in said earth formations, said radio frequency magnetic field having a principal direction substantially perpendicular to a principal direction of said static magnetic field;

detecting voltages induced in an antenna by nuclear magnetic resonance; and detecting voltages induced in said antenna by electromagnetic induction during times at which said radio frequency magnetic field is induced;

determining said resistivity properties of said earth formations from measurements of said voltages detected during said times at which said radio frequency magnetic field is induced; and adjusting measurements of said voltages detected from said nuclear magnetic resonance for effects of said resistivity properties.

19. The method as defined in claim 18 further comprising:

inducing an induction logging frequency electromagnetic field in said earth formations during a longitudinal relaxation period between successive sequences of inducing said radio frequency magnetic field; and detecting voltages induced in said receiver antennas by said induction logging frequency electromagnetic field, wherein said resistivity properties are determined by measuring a magnitude of an in-phase component of said electromagnetic induction induced voltages.

20. The method as defined in claim 19 further comprising measuring a magnitude of a quadrature component of said voltages induced by said induction logging frequency electromagnetic field, wherein said resistivity properties are determined by combining magnitudes of said in phase and said quadrature components.

21. The method as defined in claim 19 further comprising determining a spatial distribution of said resistivity with respect to said instrument wherein said step of adjusting said voltages detected from said nuclear magnetic resonance is performed with respect to said spatial distribution of said resistivity.

\* \* \* \* \*